United States Patent [19]

Baggenstoss

[11] Patent Number: 5,251,185
[45] Date of Patent: Oct. 5, 1993

[54] SONAR SIGNAL PROCESSOR AND DISPLAY

[75] Inventor: Paul M. Baggenstoss, Newport, R.I.

[73] Assignee: Raytheon Company, Lexington, Mass.

[21] Appl. No.: 961,224

[22] Filed: Oct. 15, 1992

[51] Int. Cl.⁵ .......................................... G01S 15/00
[52] U.S. Cl. ..................................... 367/100; 367/107
[58] Field of Search ..................... 367/100, 135, 107; 364/577

[56] References Cited

U.S. PATENT DOCUMENTS 4,831,602  5/1989  Kroenert et al. ................. 367/100
5,179,542  1/1993  Reese et al. ..................... 367/135

Primary Examiner—Daniel T. Pihulic
Attorney, Agent, or Firm—Donald F. Mofford; Richard M. Sharkansky

[57] ABSTRACT

An improved sonar signal processor and display combining the use of both coherent and incoherent signal processors. In addition to a conventionally used matched filter detection processor, an incoherent signal processor comprising a cross-range energy filter and a down-range energy filter is used. The cross-range energy filter detects objects characterized by a narrow bearing response; whereas the down-range energy filter detects objects characterized by a narrow range response. The detection events resulting from the incoherent signal processor are displayed in a subdued color to prevent distraction from the primary display events and to reduce the false alarm rate by allowing the sonar operator to view events in the context of natural boundaries.

7 Claims, 2 Drawing Sheets

SONAR SIGNAL PROCESSOR AND DISPLAY

BACKGROUND OF THE INVENTION

This invention relates generally to sonar systems and more specifically to a sonar system having an improved signal processor and display for reducing the false alarm rate and for displaying information corresponding to additional objects than heretofore detected and displayed.

As is known in the art, sonar systems are used on sea going vessels to detect the presence of objects in the surrounding water environment. For example, it may be desirable to detect the presence of other vessels such as ships or submarines, as well as reefs and other natural obstacles. Often it is simply desirable to distinguish vessels from natural obstacles. In general terms, a sonar system includes a transmitter, a receiver, a signal processor, and a display. The transmitter is used to transmit acoustic energy or signals, and is generally referred to as a projector. The transmitted signal is reflected by objects in the water environment to provide echoes or reflected signals to the receiver. The receiver is generally comprised of a plurality of receiving elements, such as are provided in a hydrophone array. The signals received by each of the plurality of hydrophones are processed by the signal processor for display and interpretation by the sonar system operator.

As is also known in the art, conventional sonar signal processors include a beamformer for providing a plurality of output signals or beams corresponding to the hydrophone array "looking" in multiple directions. The beams are formed by applying the received signals to a phase-shifting or time-delay network.

Some conventional sonar signal processors operate on an energy detection principle. That is, the output signals from the beamformer are energy detected by integrating the squared value of the signal to provide a corresponding plurality of signals indicative of the level of the energy associated with the given beam. This type of signal processing may be unsuitable for distinguishing between objects desired to be detected and other "clutter" detections. In other words, the output signals of the energy detector which are displayed indicate only the presence of an object (i.e. a received echo) and in no way assist the sonar system operator in determining the type of object providing the echo.

Other types of sonar signal processors operate on a matched filter or coherent processor principle. With this arrangement, the output signals from the beamformer are compared to the transmitted signal to determine whether such received signals are replicas of the transmitted signal. Thus, this type of processor may be referred to generally as a replica correlator. It is recognized that when the echo is a replica of the transmitted signal, the likelihood exists that the reflecting object is a vessel of some sort, as opposed to a natural obstacle such as a reef or other clutter. Stated differently, the echo from a vessel more closely approximates a point-like reflector whereas reefs for example, tend to spread out the echo due to their relatively large dimensions. It is noted that such time-spread echoes, such as are reflected off a reef, are better suited for detection by an energy detection scheme whereas, the point-like echo reflected off a vessel is better suited for detection by a matched filter. However, even with the use of a matched filter signal processor, the rate with which such detections falsely indicate the presence of vessels (i.e. referred to hereinafter as the false alarm rate) may be unacceptably high since other obstacles may provide echoes which replicate the transmitted signal.

One way known in the art to reduce the false alarm rate is to use both coherent and incoherent signal processors, as described in U.S. Pat. No. 4,831,603 entitled "Simultaneous Coherent and Incoherent Processor for Sonar Signals" issued on May 16, 1989 with inventors John T. Kroenert and Robert B. Delisle, and assigned to the assignee of the subject invention. The patent describes a technique for displaying only those objects detected with the coherent processor as described above when there is also a detection by the incoherent processor, such incoherent processor being referred to as a polarity coincidence correlator. In this way, the incidence of false alarms is reduced. However, the displayed information is only as sensitive as the least sensitive of the processors. Stated differently, the incoherent processor information is used to "validate" the coherent processor detected objects as being of interest for display and thus, the overall display sensitivity is reduced.

SUMMARY OF THE INVENTION

With the foregoing background in mind, it is an object of the present invention to provide a sonar system having a reduced false alarm rate.

A further object is to provide such a sonar system which allows the detections to be evaluated in the context of environmental boundaries, thereby reducing the false alarm rate.

A still further object of the present invention is to provide such a system without reducing the detection sensitivity.

Yet another object is to provide a sonar system with a display providing additional information than heretofore displayed and relating to environmental boundaries.

These and other objects of the present invention are attained generally by providing a sonar system for receiving signals reflected from objects in response to a transmitted sonar signal and for processing the received signals to provide events corresponding to the objects with each event having a range and a bearing associated therewith and corresponding to the rang and bearing of the corresponding object. The system includes a matched filter for providing a first plurality of signals, each one indicating the extent to which a corresponding one of the reflected signals replicates the transmitted sonar signal. Also provided is a cross-range energy filter for providing a second plurality of signals, each one representing the relative magnitude of a corresponding one of the reflected signals with respect to other ones of the reflected signals having the same range. A downrange energy filter provides a third plurality of signals, each one representing the relative strength of a corresponding one of the reflected signals with respect to reflected signals received at a different time but from the same direction or bearing. A display for displaying events is ultimately fed by the first, second, and third pluralities of signals.

With this arrangement, an improved sonar system is provided having a reduced false alarm rate. The matched filter processes the reflected signals to provide events generally corresponding to other vessels as is desirable but may also provide events in response to clutter such as natural boundaries. The cross-range energy filter detects events in response to objects having a relatively high cross-range energy content (i.e. cross-range energy being that which is characterized by a broad time response and a sharp or narrow bearing response). Whereas, the down-range energy filter detects events in response to objects having a relatively high down-range energy content (i.e. down-range energy being that which is characterized by a broad bearing response and a sharp or narrow time response). It is thus apparent that with this arrangement, objects other than those providing a reflected signal replicating the transmitted sonar signal, will be detected and displayed. With this arrangement, the system displays additional information which is helpful to alert the sonar system operator of obstacles such as reefs and shorelines, heretofore not displayed. Furthermore, the system reduces the false alarm rate by allowing the system operator to interpret the displayed events in the context of natural boundaries, such as reefs and shorelines, thereby providing the necessary information for such operator to distinguish between targets of particular interest, such as submarines, and other objects, such as reefs and shorelines.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENT

Figure 1:
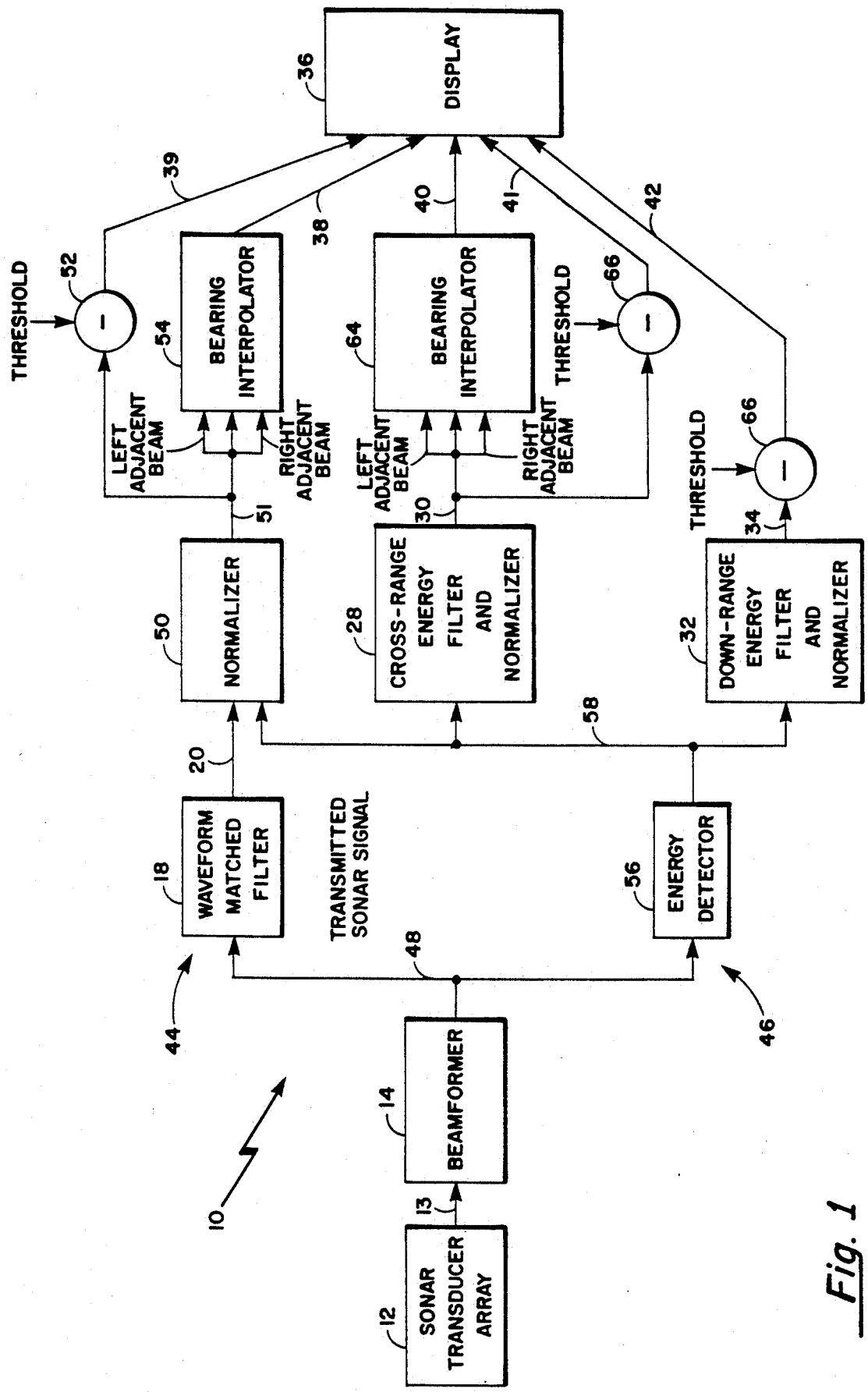
FIG. 1 is a simplified block diagram of a sonar system in accordance with the present invention.

Referring now to FIG. 1, a sonar system 10 is shown for receiving signals reflected from objects in response to a transmitted sonar signal and for processing the received signals to provide events or pings for display, with such events corresponding to the objects and having a range and a bearing corresponding to the range and bearing of the corresponding object. The sonar system 10 includes a sonar transducer array 12 for receiving the reflected signals. The transducer array 12 is coupled to a beamformer 14 via signal lines 13. Beamformer 14 provides a plurality of output signals, each one corresponding to a beam or lobe characterized by a predetermined interval of ranges and a given bearing, as is conventional. The system also includes a waveform matched filter 18 for providing a first plurality of signals, via signal lines 20, each one of such signals indicating the extent to which a corresponding one of the reflected signals replicates the transmitted sonar signal. A cross-range energy filter 28 provides a second plurality of signals, via signal lines 30, with each one of such signals representing the relative magnitude of a corresponding one of the reflected signals with respect to other ones of the reflected signals having the same range. A down-range energy filter 32 provides a third plurality of signals, via signal lines 34, with each one representing the relative strength of a corresponding one of the reflected signals with respect to reflected signals received by array 12 from the same bearing but at a different time. A display 36 is provided for displaying event and is ultimately fed by the first, second, and third pluralities of signals, via signal lines 38, 39, 40, 41, and 42, as shown.

The sonar transducer array 12 may be of any conventional type of sonar receiver or hydrophone array. Such an array 12 comprises a plurality of receiving hydrophone elements, each of which receives reflected signals. Here, thirty-six receiving elements provide thirty-six corresponding output signals having amplitudes proportional to the energy received thereby, as is conventional. The delay between transmission of the sonar signal and receipt of the reflected signals is used to determine the distance between the transducer array 12 and the reflecting object. More specifically, the reflected signals received by the plurality of hydrophones are coupled to the beamformer 14 by signal lines 13, as shown. Beamformer 14 resolves these signals to provide a corresponding plurality of output signals, carried by signal lines 48, with each one corresponding to a different beam. Each beam is characterized by a predetermined interval of ranges and a particular bearing. The beamformed signals of lines 48 are provided by applying the array 12 received signals to a phase-shifter (or time-delay) network, as is conventional.

Sonar system 10 includes two simultaneous signal processing channels 44, 46. The first channel 44 is a coherent processing channel used to detect the extent to which a signal replicates another signal. More specifically, the first processing channel 44 includes waveform matched filter 18 for providing an indication of the extent to which the beamformer output signals coupled thereto replicate the transmitted sonar signal. The waveform matched filter 18 may alternatively be referred to as a segmented replica correlator. The output signals of waveform matched filter 18, here thirty-six such signals, are normalized by a normalizer 50 before being compared to a threshold by threshold detector 52 and interpolated by interpolator 54, as will be discussed below.

The second signal processing channel 46 is an incoherent processing channel and includes an energy detector 56 fed by the beamformer output signals. Energy detector 56 provides a plurality of output or energy signals on signal lines 58, with each such energy signal representing the energy content of a corresponding one of the beamformer output signals. The energy signals are coupled to the normalizer 50 of the first signal processing channel 44 as well as to a cross-range energy filter and normalizer 28 and a down-range energy filter and normalizer 32, as shown. The output signals of the cross-range energy filter 28 (i.e. the second plurality of signals) are coupled to an interpolator circuit 64 and a threshold detector 62 before being coupled to display 36 by signal lines 40 and 41, respectively. The output signals of down-range energy filter and normalizer 32 are compared to a threshold by a threshold detector 66 before being coupled to display 36 by signal line 42.

As noted above, the waveform matched filter 18 determines the extent to which the input signals thereto match the transmitted sonar signal. That is, such filter 18 provides a plurality of output signals having amplitudes proportional to the extent to which corresponding input signals replicated the transmitted sonar signal. More particularly, the transmitted sonar signal is fed to the matched filter 18 and is compared with each of the input signals thereto to provide the corresponding plurality of output signals (i.e. the first plurality of signals) on signal lines 20. The matched filter 18 is well suited for detecting objects when there are low multipath and target distortions and low spreading by the ocean medium of the transmitted and received signal. That is, it is under such conditions that the reflected, received signals are most likely to replicate the transmitted sonar signal. Moreover, it is noted that since vessels more closely approximate a point-like reflector than large dimensioned objects like reefs which tend to spread out an echo, vessels are more likely to provide echoes replicating the transmitted signal.

The output signals of the matched filter 18 are normalized by normalizer 50. More particularly, the mean value of the energy comprising the energy signals carried by lines 58 is computed. Such mean value is subtracted from each of the first plurality of signals by normalizer 50 to provide a corresponding plurality of normalized signals to threshold detector 52 and bearing interpolator 54 via signal lines 51. Threshold detector 52 compares such normalized signals with a threshold signal having a predetermined amplitude to provide a corresponding plurality of threshold detected signals to display 36 via signal lines 39. More particularly, detector 52 compares the plurality of normalized signals with the threshold signal and passes to its corresponding plurality of outputs only those of the normalized signals which meet or exceed the threshold signal. Here, the threshold signal is provided to threshold detector from a system microprocessor (not shown) in accordance with a desired false alarm rate. That is, the false alarm rate can be controlled by adjusting the threshold signal. However, the lower the false alarm rate, the higher the sensitivity of the matched filter detection. For example, if a relatively low false alarm rate is desired and the threshold signal raised accordingly, it follows that there may be objects that will not be detected since objects providing relatively weak reflected signals may have corresponding normalized signals that do not meet or exceed the threshold signal and therefore may be eliminated as a potential event.

The plurality of normalized signals carried by signal lines 51 are coupled to bearing interpolator 54 along with a left adjacent beam signal and a right adjacent beam signal, as shown. The left and right adjacent beam signals are the two signals corresponding to the beams adjacent that of the currently processed one of the threshold detected signals. Bearing interpolator 54 interpolates the plurality of input signals thereto by comparing such signals to the signals corresponding to the adjacent beams. In this way, a plurality of bearing interpolated signals (i.e. signals having a quantization smaller than those provided directly from normalizer 50), are provided on signal lines 38 to display 36.

Figure 2B:
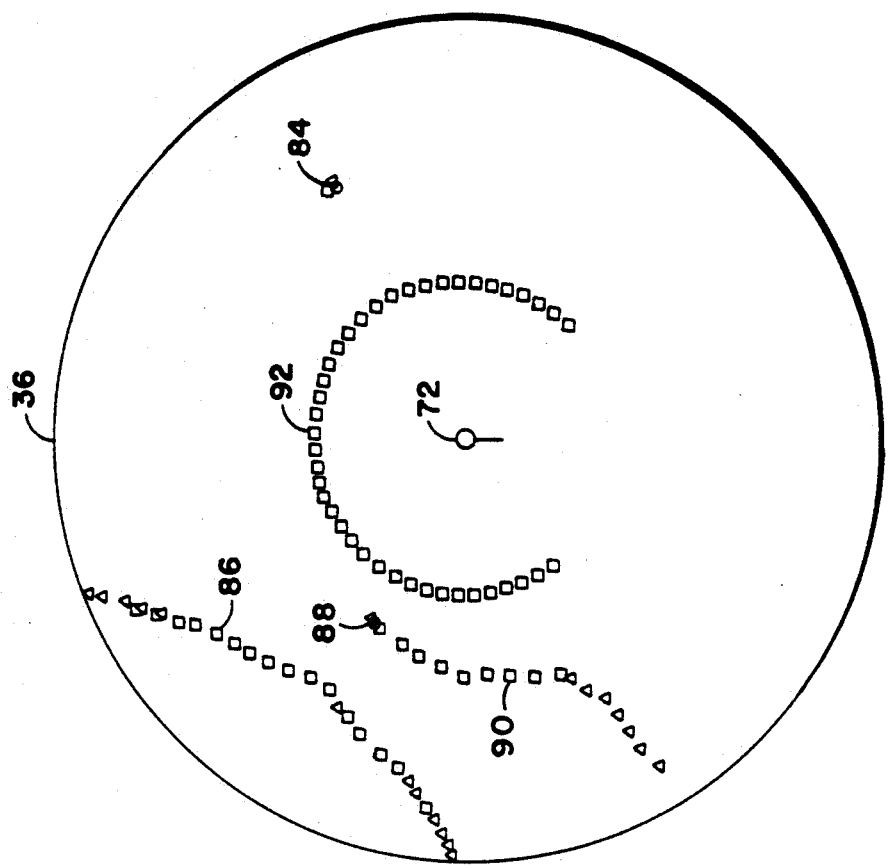
FIG. 2B is a graphically true latitude-longitude sonar display in accordance with the exemplary scene of FIG. 2A and further in accordance with the invention.
Figure 2A:
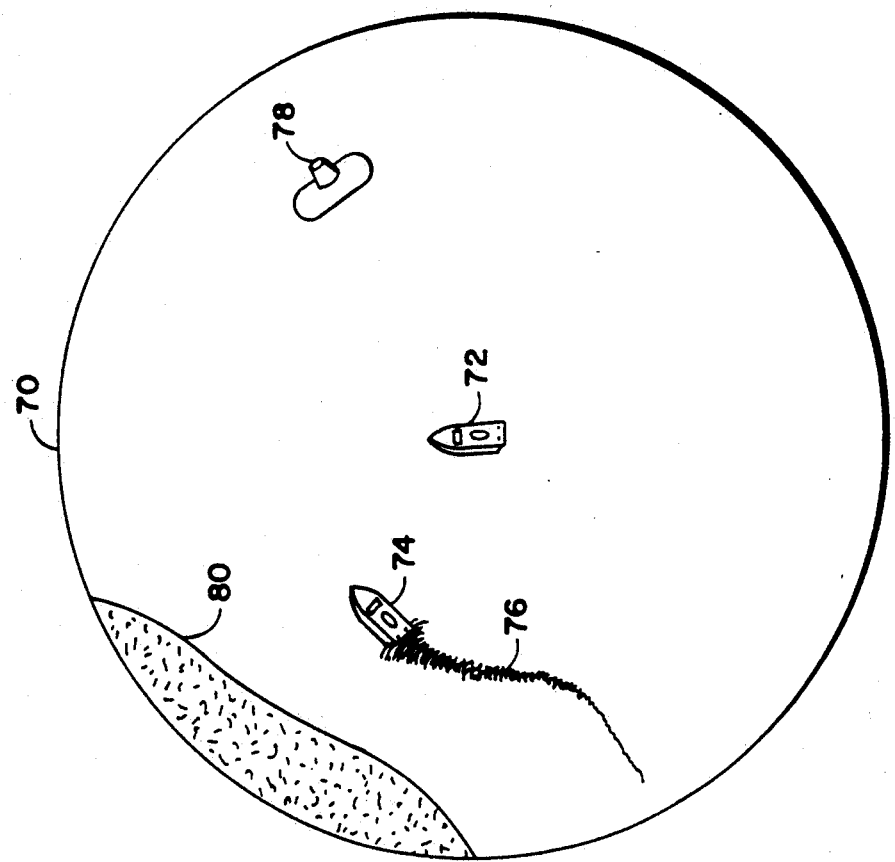
FIG. 2A is a simplified diagram of an exemplary scene from a vessel superimposed on a geographically true latitude-longitude display.

In display 36, the signals (from signal lines 38, 39, 40, 41, and 42) are used to provide indicia (i.e. alternatively referred to as events), here on a geographically true longitude-latitude display 36, as will be shown in conjunction with FIGS. 2A and 2B. Suffice it to say however that the thresholded signals provided by signal lines 39, 41, and 42 determine the brightness or intensity of the displayed indicia; whereas the bearing interpolated signals 38 and 40 determine the precise location of the indicia detected by matched filter 18 and cross-range energy filter 28, respectively, on the display. It is also noted that the entire signal processing operations of sonar system 10 are repeated a multitude of times per second. That is, samples of received reflected signals are processed from the sonar transducer array 12 to the display 36 in intervals of samples, with each interval consisting of hundreds or thousands of samples.

Considering next the second signal processing channel 46, energy detector 56 receives the beamformer output signals via signal lines 48. Each of the thirty-six beamformer output signals is squared and integrated to provide corresponding signals (carried by signal lines 58) representing the energy content of such beamformer output signals. It is thus apparent that such detector 56 does not discriminate between types of objects. That is, if a reflected signal is received, a signal representing the energy of such reflected signal will be provided at an output of detector 56 corresponding to the beam in which the object is located, regardless of whether the object from which such signal was reflected is a submarine or a shoreline for example.

The cross-range energy filter 28 is fed by the plurality of energy signals as shown and provides a plurality of signals (i.e. referred to above as the second plurality of signals, with each one representing the magnitude of a corresponding one of the reflected signals with respect to other ones of the reflected signals at the same range. Stated differently, such cross-range energy filter 28 compares each of the input signals thereto with each of the other such input signals or in other words, compares the energy at a given bearing with the energy from other bearings. Specifically, the energy in the currently processed beam is divided by the average or mean energy of all of the beams at the same range. Thus, the output signals of filter 28 provide a representation of the relative energy of the corresponding input signal; that is, relative to other such input signals. It should now be apparent that cross-range filter 28 detects those reflections having a sharp or narrow bearing response. Cross-range energy filter 28 further provides a normalization operation like that described above in conjunction with normalizer 50.

The output signals of cross-range energy filter 28 are threshold detected by detector 62 in the same manner described above for detector 52 and are interpolated by bearing interpolator 64. That is, a threshold signal having a value related to the desired false alarm rate is fed to detector 62 for comparison with such output signals coupled to detector 62 by signal lines 30. The ones of such signals exceeding the threshold will be passed to the display 36 by signal lines 41.

Like bearing interpolator 54, interpolator 64 interpolates the values of the input signals thereto by comparing such signals with other ones, and specifically adjacent ones, of the input signals. More particularly, a given input signal is compared with the two input signals representing the left and right adjacent beams. In this way, a plurality of bearing interpolated signals are provided on signal lines 40 to display 36.

Considering next the down-range energy filter and normalizer 32, signals fed to down-range energy filter and normalizer 32 are compared to like input signals received by sonar system 10 at a different time and previously stored in a memory (not shown). That is, signals previously processed by down-range energy filter 32 are stored in memory for later comparison to like, later received signals. Stated differently, down-range energy filter 32 compares the energy at a given range (i.e. corresponding to being received at a given time) with energy of other ranges. More specifically, the energy of the presently processed beam is divided by the average energy of all of the signals received during a previous interval of time and corresponding to the same beam. In view of the above, it should now be apparent that the down-range energy filter 32 detects those reflections having a sharp or narrow range (i.e. time) response. Downrange energy filter 32 further provides a normalization operation like that described above in conjunction with normalizer 50.

The plurality of output signals (i.e. the third plurality of signals) are threshold detected by detector 66 as described above in conjunction with like threshold detectors 52 and 62. In this way, the first, second, and third pluralities of signals are ultimately provided to display 36 via signal lines 38, 39, 40, 41, and 42 for display of events thus detected. Here, each of the differently processed signals are displayed in different colors. That is, the matched filter 18 processed signals or events (i.e. those events detected by the first signal processing channel 44) are displayed in a first relatively bright color, and here in green. The reason for displaying such events prominently is that such an event is likely to coincide with a object of particular interest such as a submarine or ship. However, as mentioned above, other objects may also be so detected. The events processed by the second signal processing channel 46 are displayed in a second more subdued color, and here in blue. Note that alternatively, it may be desirable to display the crossrange energy filter processed events in a one subdued color and the down-range energy filter processed events in a different color, as will become apparent from the following discussion of the display 36.

Referring now to FIG. 2A, a diagrammatical representation of an exemplary scene from a vessel is shown superimposed on a geographically true latitude-longitude display 70. The viewing vessel 72 having a sonar system 10 is shown in the center of the display 70. Also shown is a ship 74 creating a wake 76, a submarine 78, and a shoreline 80. It is noted with regard to display 70 that bearing corresponds to the angle between an object and the viewing vessel 72 and range corresponds to the distance between such object and vessel 72.

Referring now to FIG. 2B, the actual geographically true display 36 is shown as a result of the processing of signals reflected by objects 74, 76, 78, and 80, such processing being achieved by the sonar system 10 of FIG. 1. In order to portray the different types of events (i.e. the matched filter processed events, the cross-range energy filter processed events, and the down-range energy filter processed events) without using different colors, different shaped indicia are shown here. The matched filter processed events are displayed as "X", the cross-range energy filter processed events are displayed as triangles, and the downrange energy filter processed events are displayed as squares. Note that the viewing vessel is again labelled 72 and on the actual display 36 is shown as a circle. Considering first the event labelled 84, it is noted that such event is detected by both the matched filter 18, the down-range energy filter 32, and the cross-range energy filter 28 and corresponds to submarine 78 (FIG. 2A). As should now be apparent, the matched filter 18 detected this event 84 because the signal reflected from submarine 78 replicated the transmitted sonar signal. Further, both the cross-range energy filter 28 and the down-range energy filter 32 detected such event since it is characterized by a relatively sharp bearing response and a sharp range (i.e. time) response, respectively.

With regard to the shoreline 80 and the ship 74 with its accompanying wake 76, the corresponding events 86-90 shown on the actual display 36 have components detected by both the coherent signal processing channel 44 and the incoherent signal processing channel 46. More specifically, those portions high in down-range energy are indicated by squares, whereas portions high in cross-range energy are indicated as triangles. An additional event 92 is shown to have a high down-range energy content. Here such event 92 corresponds to a reflection from the ocean floor at a particular range but at all bearings.

From the above discussion of display 36 and signal processing channels 44, 46, it should now become apparent that sonar system 10 has a reduced false alarm rate than heretofore achieved. Further this advantage is realized without sacrificing detection sensitivity; and, in fact, system 10 has increased sensitivity. Additional events than heretofore detected and displayed are detected by incoherent signal processing channel 46 and displayed by display 36. Specifically, cross-range energy filter 28 detects those reflecting objects which are characterized by a narrow bearing response; whereas, down-range energy filter 32 detects those reflecting objects which are characterized by a narrow range response. With this arrangement, and specifically with the additionally displayed events, an operator of the sonar 10 can interpret the events in the context of the surrounding boundaries. Instead of viewing just the matched filter processed events, the operator can better discriminate between objects. For example, whereas with prior art sonar systems only events 88 and 84 would be displayed (i.e. in those prior art sonars utilizing only coherent signal processors), the operator of sonar 10 is able to distinguish event 84 as a submarine and event 88 as a ship due to the wake 90 trailing such event 88. In this way, the false alarm rate of sonar 10 is reduced while the sensitivity thereof is increased.

Having described preferred embodiments of the invention, it will now become apparent to one of skill in the art that other embodiments incorporating their concepts may be used. It is felt, therefore, that these embodiments should not be limited to disclosed embodiments, but rather should be limited only by the spirit and scope of the appended claims.

What is claimed is:

1. A sonar system for receiving signals reflected from objects in response to a transmitted sonar signal and for processing the received signals to provide events corresponding to said objects with each event having a range and a bearing associated therewith and corresponding to the range and bearing of said objects, said system comprising:

means, fed by said reflected signals, for providing a first plurality of signals, each one indicating the extent to which a corresponding one of said reflected signals replicates said transmitted sonar signal;

a cross-range energy filter for providing a second plurality of signals, each one representing the magnitude of a corresponding one of said reflected signals with respect to other ones of said reflected signals having a different bearing and the same range;

a down-range energy filter for providing a third plurality of signals, each one representing the strength of a corresponding one of the reflected signals with respect to reflected signals received at a different time and having the same bearing; and means, fed by said first, second, and third pluralities of signals for displaying events corresponding to objects.

2. The sonar system recited in claim 1 further comprising a sonar transducer array for receiving said reflected signals and a beamformer coupled to said sonar transducer array for providing a plurality of output signals, each one corresponding to a beam, wherein said beam has a predetermined bearing and an interval of ranges associated therewith.

3. The sonar system recited in claim 2 further comprising an energy detector, fed by said beamformer output signals, for providing a plurality of energy signals, each one representing the energy received in the corresponding beam, wherein said cross-range energy filter and said downrange filter are fed by said energy signals.

4. A sonar system for receiving signals reflected from objects in response to a transmitted sonar signal and for processing the received signals to provide events corresponding to said objects, with each event having a range and a bearing associated therewith and corresponding to the range and bearing of the objects, said system comprising:

means, fed by said reflected signals, for providing a first plurality of signals, each one indicating the extent to which a corresponding one of said reflected signals replicates said transmitted sonar signal;

means for providing a second plurality of signals, each one being related to the energy content of a corresponding one of the reflected signals; and means, fred by said first and second plurality of signals, for displaying an event in response to the ones of the first and second plurality of signals exceeding a predetermined threshold.

5. The sonar system recited in claim 4 wherein said means for providing a second plurality of signals comprises a cross-range energy filter and a down-range energy filter.

6. The sonar system recited in claim 4 wherein said means for providing a first plurality of signals comprises a matched filter.

7. The sonar system recited in claim 4 further comprising a sonar transducer array for receiving said reflected signals and a beamformer, coupled to said sonar transducer array, for providing a plurality of output signals, each one corresponding to a beam, wherein said beam has a predetermined bearing and an interval of ranges associated therewith.

* * * * *